United States Patent [19]

Fresard et al.

[11] 3,803,383
[45] Apr. 9, 1974

[54] ARRANGEMENT FOR THE ADJUSTMENT OF THE HEATING PLATE IN AN ELECTRIC IRONING PRESS

[75] Inventors: Marcel Fresard, Petit-Lancy; Antonio Jimenez, Meyrin, both of Switzerland

[73] Assignee: Mefina S.A., Friboury, Switzerland

[22] Filed: Dec. 8, 1972

[21] Appl. No.: 313,442

[30] Foreign Application Priority Data
Mar. 8, 1972 Switzerland.................. 3488/72

[52] U.S. Cl................. 219/243, 38/24, 219/251
[51] Int. Cl. .............................................. H05b 1/00
[58] Field of Search.................. 219/243, 250, 251; 100/93 P; 38/24–28

[56] References Cited
UNITED STATES PATENTS

| | | | |
|---|---|---|---|
| 2,408,750 | 10/1946 | Bolte............................ | 219/252 X |
| 2,593,194 | 4/1952 | Rollman....................... | 219/252 |
| 2,976,388 | 3/1961 | Finlayson et al.............. | 219/252 |

Primary Examiner—C. L. Albritton
Attorney, Agent, or Firm—Emory L. Groff

[57] ABSTRACT

In an ironing press a common knob controls simultaneously the adjustment of a thermostat in accordance with the temperature to be reached by the ironing plate according to the material to be ironed and the progression of a tape which is thus caused to move between a source of light and a panel provided with a translucent strip and with symbols corresponding to the temperature required for these different materials. A line separating two successive transparent and opaque sections of the tape is thus automatically brought into registry with the symbol corresponding to the temperature for which the thermostat is adjusted at the same time.

9 Claims, 7 Drawing Figures

ARRANGEMENT FOR THE ADJUSTMENT OF THE HEATING PLATE IN AN ELECTRIC IRONING PRESS

The present invention has for its object an arrangement for adjusting the temperature of the heating plate in an electric ironing press such as that disclosed in Said prior arrangement includes a thermostat the adjustment of which is provided by a hand-controlled knob while the temperature to be assumed by the heating plate is displayed by means controlled by said knob synchronously with the thermostat and the feed of electric energy is switched off under the action of the same knob when it reaches the end of its thermostat-adjusting range.

According to the present invention, the means displaying the temperature to be assumed by the plate comprise a tape including two successive differentiated sections of which one at least is translucent, said tape being controlled by the thermostat-adjusting knob which causes said tape to be shifted across the gap between a source of light and an at least partly translucent panel.

There is illustrated in the accompanying diagrammatic drawings, given by way of a mere exemplification, an embodiment of an arrangement according to the invention. In said drawings.

Figure 1:
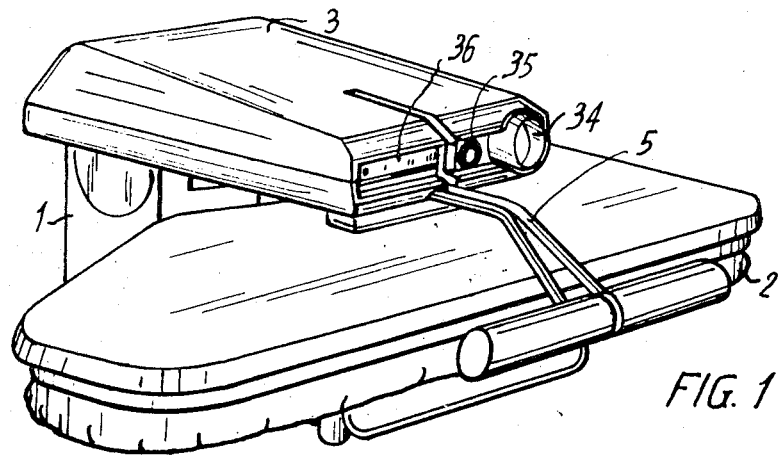
FIG. 1 is a general perspective view of an ironing press incorporating said improved arrangement.
Figure 2:
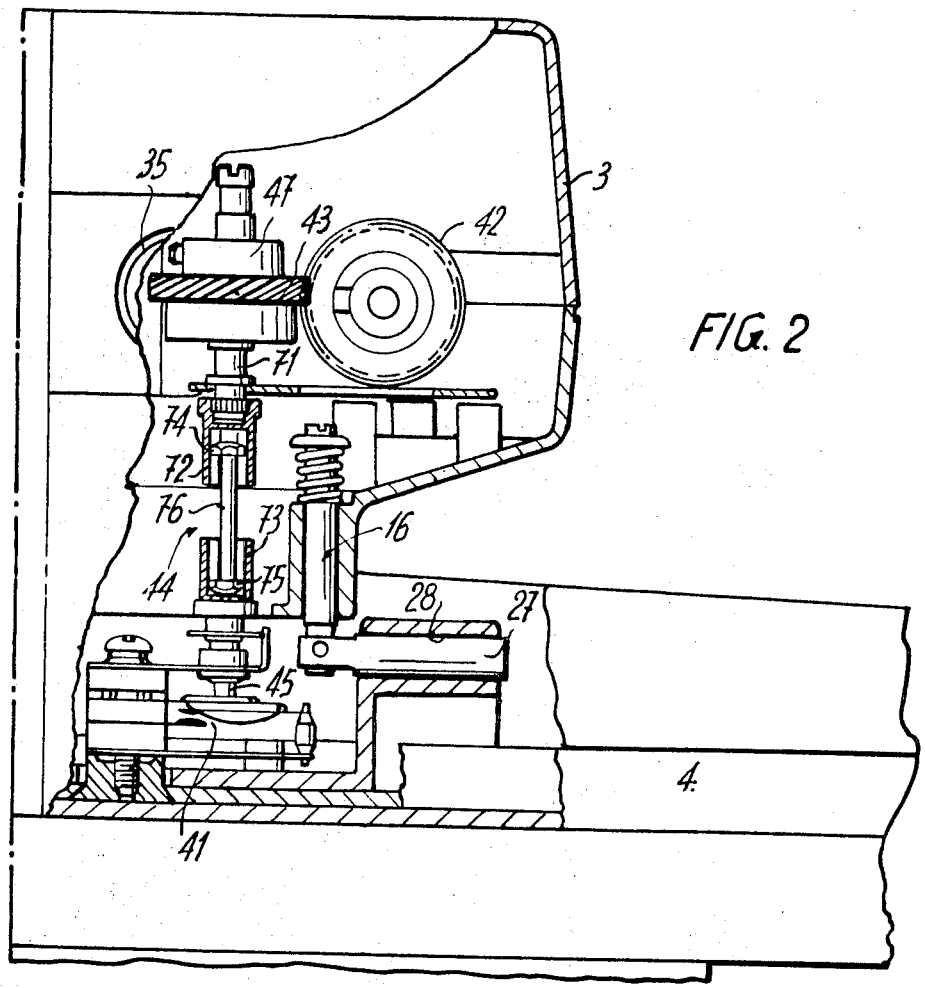
FIG. 2 is an elevational view thereof on a larger scale, the carrier arm being partly torn off.

As illustrated in FIGS. 1 and 2, the electric ironing press includes a frame 1 carrying an ironing board 2 with a coat of plastics. An arm 3 on which is hung a heating plate 4 acting as a sad-iron, is pivotally secured through its rear-edge to the frame 1 round a horizontal axis. A hand-controlled lever 5 is pivotally secured to the arm 3 at a point remote from said horizontal axis and cooperates with the outlines of two cams, which are not illustrated, said cams carried by the frame 1 defining the opening and the closing of the press.

The arm 3 encloses a portion of the means adjusting the temperature of the heating plate 4. Said means include a thermostat carried by the heating plate 4, and associated as illustrated in FIG. 1 with a knob 34 provided for the adjustment of said thermostat, a tell-tale lamp 35 extinguished when the thermostat switches off the feed of electric energy into the device heating the plate 4 and a panel 36 showing the temperature to be assumed by the heating plate 4.

The knob 34 drives, through the agency of the worm gear 42, 43 and of a pivotal coupling 44, a shaft 45 controlling the adjustable thermostat 41 (see FIG. 2). Simultaneously, a tape 46 (FIG. 3) is wound or unwound round a drum 47 coaxially coupled with the worm wheel 43 of the worm gear 42, 43.

One end of the tape 46 is connected through a securing member 48 to one end of a return spring 49, the other end of which is secured to a rib 50 formed on the inside of the arm 3. The tape 46 the other end of which is secured to the drum 47 is guided over the pulleys 51, 52 so as to move through the gap 53 between the panel 36 showing the temperature to be assumed by the heating plate 4 and a projector 54 illuminating said panel 36.

Figure 4:
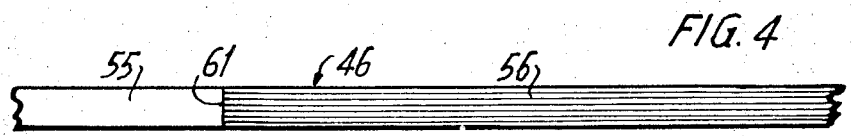
FIG. 4 is a plan view of a portion of the temperature-indicating tape, to either side of the line separating its successive differentiated sections.
Figure 7:
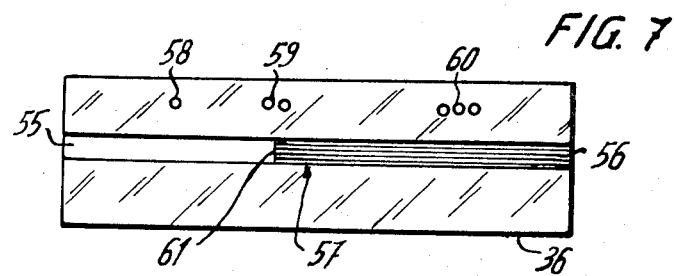
FIG. 7 is an elevational view of the panel showing the temperature to be assumed by the heating plate.

The tape 46 includes in sequence a transparent section 55, preferably red, and an opaque section 56, preferably black (FIG. 4), and it moves behind a medial translucent strip 57 which is formed in the panel 36 and is narrower than the tape 46 (FIG. 7). The panel 36 is opaque and preferably black, except for said translucent strip 57 and the symbols 58, 59, 60 corresponding to different temperatures to be assumed by the heating plate 4.

It will be readily understood that the line 61 separating the transparent red section 55 from the opaque black section 56 of the tape 46 moves behind the translucent strip 57 in the panel 36, in synchronism with the adjustment of the thermostat 41 provided by the adjusting knob 34, so that said line may serve as a guide mark registering selectively with the symbols 58, 59, 60 in a manner similar to the marking, by the upper end of the liquid column of a thermometer, of the scale indications on the latter.

Figure 5:
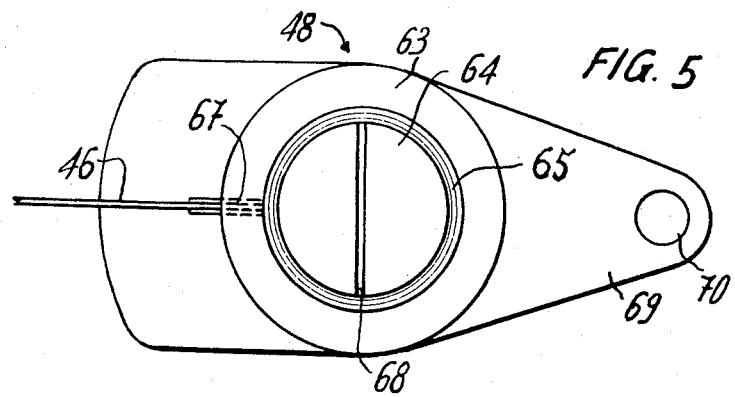
FIG. 5 is a view from underneath on a larger scale of a detail of FIG. 3 including a member adjusting the position of the tape.
Figure 6:
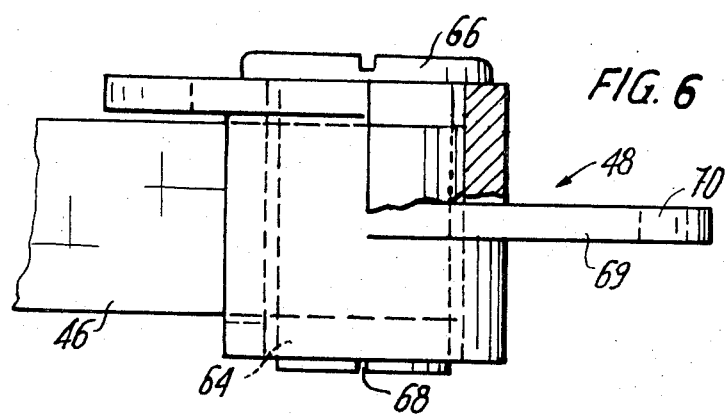
FIG. 6 is an elevational view, partly torn off, of said member illustrated in FIG. 5.

The securing member 48 and a similar securing member 62 carried by the drum 47 engaging the opposite ends of the tape 46 connect the latter respectively with the return spring 49 and with the drum 47. Said securing member 48 is illustrated in detail in FIGS. 5 and 6. It includes a socket 63 inside which is rotatably carried, with a clearance, a spool the hub 64 of which has a diameter which is smaller than the inner diameter of the socket 63.

Figure 3:
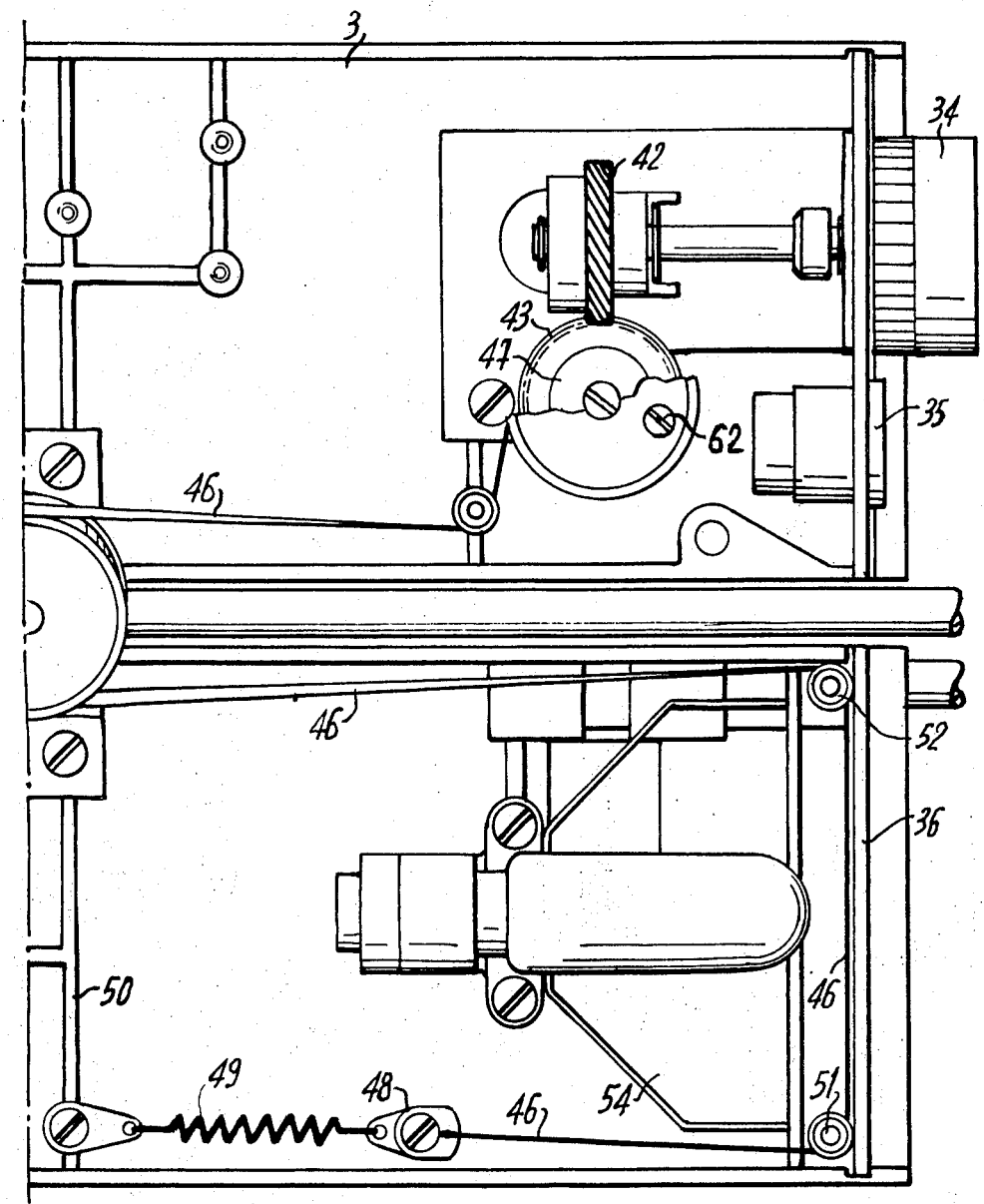
FIG. 3 is a view from above the inside of the carrier arm.

The wall of the socket is slotted at 67 along one of its generating lines with which a diametrical slot 68 in the spool hub 64 may register so as to allow the insertion of one end of the tape 46 into said slot 68. Said end of the tape may then be wound round the hub 64 of the spool and for this purpose a screw-driver may be set inside a notch in the head 66 of the spool. After several turns given to the spool round its axis, the terminal portion of the tape 46, wound round the hub 64 inside the annular gap between said hub and the wall of the socket 63, locks the tape inside the latter and clamps it thus firmly through its end in the securing member 48. A lug 69 rigid with the socket 63 is provided with a hole 70 through which one end of the return spring 49 may be inserted as illustrated in FIG. 3. The other end of the tape 46 is secured in a similar manner to the other securing member 62 which is similar in its structure to the member 48 and is eccentrically fitted on the drum 47.

The position of the line 61 separating the transparent red and opaque black sections of the tape 46 may be adjusted so as to register, for instance, with the symbol 60 corresponding to the desired temperature to be assumed by the plate 4 for the ironing, say, of cotton goods or of linen. To this end, the operator turns the knob 34 clockwise home towards the right, which leads to an adjustment of the thermostat 41 corresponding to a raising of the plate 4 to a temperature ranging between about 140° and 210° C. The drum 47, being now released with reference to the shaft 71 carrying the worm gear 43, is then caused to revolve round its axis until the line 61 between the two tape sections registers with the symbol 60 corresponding to the desired heating temperature. The drum 47 is then secured again to the shaft 71 and the line 61 between the tape sections behind the panel 36 can henceforwards move in synchronism with the adjustment of the thermostat 41.

Of course, the spring 49 should at the same time be sufficiently tensioned so that the tape 46 may remain stretched when the knob 34 is turned anticlockwise home towards the left. This left turning of the knob produces first an adjustment of the thermostat 41 corresponding to a setting of the plate 4 at a temperature underneath 50° C, after which the switch, not illustrated, feeding the current is opened by the knob 34. At such a moment, the line 61 separating the two differentiated sections of the tape 46 is returned to the extreme left hand side of the translucent strip 57 in the panel 36.

The intermediate symbols 58 and 59 on the panel correspond to adjustment of the thermostat 41 ensuring a raising of the plate 4 to temperatures of a magnitude ranging between 70 and 120° C and between 105 and 160° C respectively. When the line 61 separating the differentiated sections of the tape 46 is brought into registry with one of these intermediate symbols and the switch controlling the feed of electric energy has been closed through a turning of the knob 34 clockwise towards the right, the press is adjusted for the ironing of silk or of the superpolyamide sold under the registered trade mark Nylon, when the line 61 registers with the symbol 58 and of woollen goods when the line 61 registers with the symbol 59. In all cases, when the desired temperature is reached, the thermostat causes the extinction of the tell-tale lamp 35.

As illustrated in FIG. 7, the symbols 58, 59 and 60, corresponding to the above-mentioned adjusted temperatures, which are to control the thermostat 41 carried by the panel 36, are constituted by the conventional symbols in force in the textile industry as marks defining the ironing temperatures allowed for various materials. Said symbols which appear in fact on the labels attached to the goods are as follows:

0 ironing of silk and Nylon 00 ironing of wool 000 ironing of cotton

As illustrated in FIG. 2, the adjustable thermostat 41 is secured to the heating plate 4 which latter is connected with the arm 3 through elastic suspension members 16, located to either side of a ball and socket joint, not illustrated. Two pivots 27 fitted in corresponding bores 28 formed in the plate 4 are hinged to the ends of the elastic suspension members 16 so as to cooperate still further in the mobility of the heating plate 4 with reference to the arm 33.

In order to take this into account, there is provided the pivotal coupling 44 between the shaft 71 of the worm wheel 43 and the shaft 45 controlling the adjustable thermostat. Said coupling 44 includes two sockets 72 and 73 rigid respectively with the ends facing each other on the shafts 71 and 45. The blind bore in each of said sockets has a hexagonal cross-section and forms a housing for the hemispherical head 74 or 75, as the case may be, formed at the corresponding ends of the rod 76 connecting said heads, the inner parts of which have a hexagonal cross-section to match their housings.

Thus, the rod 76 may rotate in unison with the sockets 72 and 73 inside which its heads may slide or assume slanting positions as defined by the relative movements of the heating plate 4 with reference to the arm 3.

Numerous modifications may be brought to the embodiments disclosed hereinabove of the arrangement adjusting the temperature of the heating plate in an electric ironing press, without thereby widening the scope of the invention as defined in the accompanying claims.

Instead of resorting to a tape 46 the ends of which are connected respectively to a return spring 49 and to a drum 47, it is possible, for instance, to adjust the temperature defined by the symbols 58 to 60, by means of an endless tape running over the drum 47 associated with one or more further rollers.

We claim:

1. In an electric ironing press provided with a heating plate, a supply of electric energy feeding said plate and an adjustable thermostat controlling the temperature produced by said supply in said plate, the combination on a carrier arm, of a tape provided with a reference mark, a source of light, and a panel in front of said source of light carrying a plurality of temperature-indicating marks, a hand-operable control knob, and means through which said knob is adapted to control simultaneously the adjustment of the thermostat in accordance with the desired temperature to be assumed by the plate and the progression of the tape through the gap between the source of light and the panel to make the reference mark on the tape register with a selected temperature-indicating mark on the panel.

2. An arrangement as claimed in claim 1, wherein the panel is opaque and is provided with a light-permeable strip extending over the tape in a direction parallel with the direction of progression of the latter in the gap, the temperature-indicating marks on the panel being also light-permeable.

3. An arrangement as claimed in claim 1, wherein the tape includes two successive differentiated sections of which one at least is light-permeable, the line separating said two sections forming the reference mark on the tape.

4. An arrangement as claimed in claim 1, wherein the knob-controlled means include a rotary drum over which one terminal section of the tape is wound, a return spring fitted between a stationary point and the other terminal section of the tape, and rollers over which the tape is urged into and through the gap.

5. An arrangement as claimed in claim 1, wherein the knob controlled means include a rotary drum, a return spring one end of which is secured to a stationary point, a securing member fitted between one end of the tape and the free end of the spring, the other end of the tape being secured to the drum to ensure the winding of the tape round the latter, and rollers over which the tape is urged into and through the gap.

6. An arrangement as claimed in claim 1, wherein the knob-controlled means include a rotary drum, a return spring one end of which is secured to a stationary point and the other end of which is secured to one end of the tape, a securing member rigid with the drum and engaged by the other end of the tape to ensure the winding of the tape round the latter and rollers over which the tape is urged into and through the gap.

7. An arrangement as claimed in claim 1, wherein the knob-controlled means include a rotary drum, a return spring one end of which is secured to a stationary point, means securing the ends of the tape respectively to one of the following parts; the free end of the spring and a point of the drum, at least one of last mentioned means being constituted by a socket rigid with the corresponding part and provided with a slot along a generating line, a spool revolvably carried inside said socket and provided with a slot along a generating line, the corresponding tape end being introduced into the slots upon registry between them to ensure the winding of the tape round the spool until its convolutions engage the inner periphery of the socket.

8. An arrangement as claimed in claim 1, wherein the knob-controlled means include a rotary drum over which one terminal section of the tape is wound, a return spring fitted between a stationary point and the other terminal section of the tape, rollers over which the tape is urged into and through the gap, a shaft coaxially driven by the drum, a shaft controlling the thermostat and a pivotal connection between said shafts to allow the thermostat to assume a pivotal movement with reference to the carrier arm.

9. An arrangement as claimed in claim 1, wherein the knob-controlled means include a rotary drum over which one terminal section of the tape is wound, a return spring fitted between a stationary point and the other terminal section of the tape, and rollers over which the tape is urged into and through the gap, a shaft coaxially driven by the drum, a shaft controlling the thermostat and a pivotal connection between said shafts to allow the thermostat to assume a pivotal movement with reference to the carrier arm, said pivotal connection including two sockets respectively rigid with the cooperating ends of said shafts and the inner cross-section of which is non-circular and a rod the ends of which form heads engaging the corresponding sockets to revolve in unison with the latter.

* * * * *

UNITED STATES PATENT OFFICE
CERTIFICATE OF CORRECTION

Patent No. 3,803,383     Dated April 9, 1974

Inventor(s) Marcel Fresard and Antonio Jimenez

It is certified that error appears in the above-identified patent and that said Letters Patent are hereby corrected as shown below:

In the heading, the address of the Assignee should be spelled Fribour<u>g</u> rather than Fribour<u>y</u>.

Signed and sealed this 3rd day of September 1974.

(SEAL)
Attest:

McCOY M. GIBSON, JR.
Attesting Officer

C. MARSHALL DANN
Commissioner of Patents